United States Patent
Gatti et al.

(10) Patent No.: US 7,188,867 B2
(45) Date of Patent: Mar. 13, 2007

(54) PYROTECHNICALLY-CONTROLLED ENERGY STORAGE DEVICE FOR VEHICLE STEERING COLUMNS

(75) Inventors: Jean-Marc Gatti, Vendome (FR); Gérald Giboureau, Tours (FR)

(73) Assignee: Nacam France SA, Vendome (FR)

( * ) Notice: Subject to any disclaimer, the term of this patent is extended or adjusted under 35 U.S.C. 154(b) by 403 days.

(21) Appl. No.: 10/845,129

(22) Filed: May 14, 2004

(65) Prior Publication Data

US 2004/0232685 A1 Nov. 25, 2004

(30) Foreign Application Priority Data

May 19, 2003 (FR) ................................. 03 06000

(51) Int. Cl.
*B62D 1/19* (2006.01)
(52) U.S. Cl. ..................................... 280/777
(58) Field of Classification Search .............. 280/777; 74/492, 493
See application file for complete search history.

(56) References Cited

U.S. PATENT DOCUMENTS

| | | | |
|---|---|---|---|
| 4,989,898 A | 2/1991 | Yamaguchi | |
| 5,692,778 A | 12/1997 | Cymbal | |
| 5,961,146 A * | 10/1999 | Matsumoto et al. | ........ 280/777 |
| 6,367,840 B1 | 4/2002 | Duval et al. | |
| 6,575,497 B1 * | 6/2003 | McCarthy et al. | ......... 280/777 |
| 6,641,167 B2 * | 11/2003 | Riefe et al. | .................. 280/777 |
| 6,749,222 B2 * | 6/2004 | Manwaring et al. | ........ 280/777 |
| 6,814,373 B2 * | 11/2004 | Munro et al. | ................ 280/777 |
| 2002/0020999 A1 | 2/2002 | Duval | |
| 2002/0033593 A1 | 3/2002 | Hancock | |

FOREIGN PATENT DOCUMENTS

| | | |
|---|---|---|
| DE | 19542491 C1 | 2/1997 |
| DE | 199 61 016 A1 | 8/2001 |
| EP | 474400 A2 | 3/1992 |
| FR | 2802884 | 6/2001 |
| GB | 1296527 | 11/1972 |
| GB | 1584 984 | 2/1981 |
| JP | 55068471 | 5/1980 |
| JP | 59008560 | 1/1984 |

* cited by examiner

*Primary Examiner*—David R. Dunn
(74) *Attorney, Agent, or Firm*—Lawrence E. Laubscher, Sr.; Lawrence E. Laubscher, Jr.

(57) ABSTRACT

An adjustable-force energy absorbing device includes first and second support members connected for sliding movement in a direction parallel with the steering shaft axis of a vehicle, the first support member being secured to the vehicle chassis, and the second support member being connected with the outer tube of the steering mechanism. Upon impact, the second support member is displaced from its normal first position spaced from one end of the first support member toward a second position adjacent the first support member one end. This displacement is resisted by at least one U-shaped energy absorbing element, the number and/or degree of operability of the energy absorbing elements being controlled by at least one impact-responsive pyrotechnic device.

13 Claims, 8 Drawing Sheets

PYROTECHNICALLY-CONTROLLED ENERGY STORAGE DEVICE FOR VEHICLE STEERING COLUMNS

BACKGROUND OF THE INVENTION

1. Field of the Invention

An adjustable-force energy absorbing device is disclosed including first and second support members connected for sliding movement in a direction parallel with the steering shaft axis of an automotive vehicle, the first support member being fixed and secured to the vehicle chassis, and the second support member being movable and connected with the outer support tube of the steering mechanism. Upon impact, the second support member is displaced from its normal first position spaced from one end of the first support member toward a second position adjacent the first support member one end. This displacement is resisted by at least one U-shaped energy absorbing element, the number and/or degree of operability of the energy absorbing elements being controlled by at least one impact-responsive pyrotechnic device.

2. Description of the Related Art

As evidenced by the prior U.S. Pat. No. 4,989,898, to Yamaguchi, et al., the British patent No. 1,584,984 and the German patent No. DE 195 42 491 C1, among others, it is well known in the patented prior art to provide energy storing means for absorbing the impact energy developed in a steering mechanism upon impact of an automotive vehicle. As shown by these patents, U-shaped energy absorbing means are often connected between the steering means of the vehicle and its chassis.

The increasing improvement of safety with regard to steering columns requires designers to master all of the parameters of energy absorption systems. Regarding the process involved in the absorption of energy on a steering column, it is thus envisaged that one would modulate that energy absorption according to the characteristics of the driver, such as especially the weight of the driver, whether or not the driver's seat belt has been fastened, the driver's position with respect to the steering wheel as well as the speed of the vehicle that acts upon the wheel in case of an impact.

The present invention was developed to provide an adjustable-free energy absorption device that works directly according to the direction of the shock and that puts into action simple energy absorption elements that are easy to manufacture. The present invention makes it possible in a quantified manner to absorb all or a portion of the required energy to be dissipated, which will take into account the characteristics of the driver and the vehicle while being easily installed in the space occupied by existing steering columns.

BRIEF SUMMARY OF THE INVENTION

Accordingly, a primary object of the present invention is to provide an adjustable-force energy absorbing device including first and second support members connected for sliding movement in a direction parallel with the steering shaft axis of a vehicle, the first support member being fixed and secured to the vehicle chassis, and the second support member being connected with the outer support tube of the steering mechanism. Upon impact, the second support member is displaced from its normal first position spaced from one end of the first support member toward a second position adjacent the first support member one end. This displacement is resisted by at least one U-shaped energy absorbing element, the number and/or degree of operability of the energy absorbing elements being controlled by at least one impact-responsive pyrotechnic device.

According to one particular embodiment, the invention relates to a device for the controlled absorption of energy on an automotive vehicle steering column, which comprises a steering column mounted for rotation in a tube body around a steering shaft. The tube body is linked to a support assembly, which is attached upon the chassis of the vehicle.

The fixed support member is integral with the vehicle chassis, and a movable movable member is slidably connected with the fixed support member so as to constitute the support assembly. The movable support member is normally restrained against movement relative to the fixed support member at a specific value so that this restraining action would cease in case of an impact so as to reactivate the energy absorption device.

The absorption device furthermore includes comprises at least one energy absorption means, which includes at least two generally U-shaped absorption elements of specific length and cross-section. Each absorption element comprises a first terminal portion, a curved central portion and a second terminal portion. The first terminal portion of the absorption element is linked to the movable support member by a retaining pin. The central portion of the absorption element has a shape that is essentially elongated along the direction of the effort to be absorbed and it is folded back upon itself with a predetermined degree of curvature around an axis that extends generally normal to the direction of the effort to he absorbed. A second terminal portion is connected with the fixed support member by a retaining pin. At least one of the retaining pins is mounted for axial displacement by means of pyrotechnical displacement means which are activated in turn by control means.

In case of an impact and depending on the value of the chosen parameters, the movable support element is linked to the fixed support element by a desired number of absorption elements so that the movable support element, linked to the tube body and thus to the steering wheel, will be moved with relation to the fixed support element while absorbing either all or a portion of the required energy that is to be dissipated.

The pyrotechnical displacement control means are so arranged that in case of an impact, the movable support member, linked to the tube body and thus to the steering wheel, will be displaced with respect to the fixed support member, absorbing all or a portion of the required energy that is to be dissipated.

Each of at least two absorption elements of the energy absorption assembly has a certain cross-section that is specific for it so as to absorb a particular quantity of energy.

In the case of only one single absorption element, the mobile support member is linked to the fixed element by any absorption element or by the absorption element. At least one of the absorption elements has a movable retaining pin. The pyrotechnical displacement control means are so arranged that in case of an impact, the movable support member will be linked to the fixed support member by any absorption element, by the first absorption element, by the second absorption element, or by the two absorption elements. Thus, the movable support member, linked to the tube body and thus to the steering wheel, will be displaced with respect to the fixed support member while absorbing all or a portion of the required energy to be dissipated.

In the case of three absorption elements, at least one absorption element has a movable retaining pin operable by the pyrotechnic device. The movable support member is linked to the fixed support member by any absorption element, by the first absorption element, by the second absorption element, by the third absorption elements, by the first with the second absorption element, by the first with the third absorption element, by the second with the third absorption element, or by the three absorption elements.

Advantageously, the central portion of each absorption element comprises a strip with a rectangular or a square cross-section, which is arranged between a support face of the fixed support member and a support face of the movable support member. Thus, there is no relative friction between the outer face with respect to fold of said strip and each of said support faces during the impact. The length and the cross-section of the central portion have values that are determined by the quantity of energy to be absorbed.

The strip can be of the deformable kind that has a constant cross-section or a cross-section that varies uniformly or by levels.

In the case of an absorption assembly with two absorption elements, the first terminal portion of one of the two absorption elements is in the form of a single common base with the first terminal portion of the other element. The base comprises at least one aperture that receives an element for attachment upon the movable support member.

In the case of an absorption assembly with three absorption elements, the first terminal portions of the three absorption elements will form a single common base. Said base comprises at least one hole that receives an element for attachment upon the movable support member.

In a particular interesting structural embodiment of the invention, the fixed support member comprises a plate that is attached on one side against the structure of the vehicle and that on the other side has two guides extending essentially parallel to the vertical plane passing through the steering shaft.

The movable support member comprises two guides that are essentially parallel to the vertical plane and a coupling element. The two guides on the fixed and movable members engage each other and slide in case of an impact. The coupling element is situated on the side of the fixed support element and at a certain distance from the plate of the fixed support element to make it possible to house the energy absorption assembly in the chamber defined between the support face of the fixed support element and the support face of the mobile support element. These spaced support faces oppose and are essentially parallel to each other, and they are essentially normal to the vertical plane of the steering shaft.

In one embodiment, the absorption assembly comprises three absorption elements of which each first end is coupled to a common base equipped with two apertures, each of which receives an attachment element in a corresponding hole made in the coupling element. The second end of the central absorption element comprises an aperture for the passage of a retaining pin that is axially displaceable pyrotechnical actuator. The second end of each lateral absorption element comprises a hole for the passage of a fixed retaining pin.

Each fixed retaining pin is made up of an element for attachment in a corresponding hole made in the fixed support element.

The hole for the passage of the movable retaining pin operable by the pyrotechnical actuator comprises a circular portion that is adjusted with the movable retaining pin. The circular portion is extended in the direction of sliding movement by a narrow oblong extension intended to receive an intermediate portion of reduced diameter formed in the movable retaining pin to ensure the locking of its position in case of an impact.

The controllable energy absorption device according to the present invention thus offers the advantage of a structure that is simple to make with a manufacturing quality guarantee capable of being inexpensively produced in very large numbers, as is the case in the automotive industry. Moreover, the device is easily adapted for use in the limited space provided by existing steering columns. Finally, the controllable energy absorption devices makes it possible to adapt the energy absorption to all or a portion of the energy required, taking into account especially the weight of the driver and his position with respect to the steering wheel, the condition of fastening of the seat belt, and the speed of the vehicle, while maintaining the same course of rolling motion.

The device according to the invention is applied especially to a steering column that is adjustable in terms of depth or inclination or a steering column that is adjustable in terms of depth and inclination, whose steering shaft is installed in a tube body which is supported and locked upon the body in the desired position. The steering column comprises a steering shaft that is installed so that it can turn in a tube body, which is linked to a support assembly attached to the chassis of the vehicle or to an element of the body. The invention can also be applied to a non-adjustable steering column; in that case, the tube body is installed directly in the support assembly.

BRIEF DESCRIPTION OF THE DRAWINGS

Other objects and advantages of the invention will become apparent from a study of the following specification when viewed in the light of the accompanying drawings, in which.

DETAILED DESCRIPTION OF THE INVENTION

Figure 1:
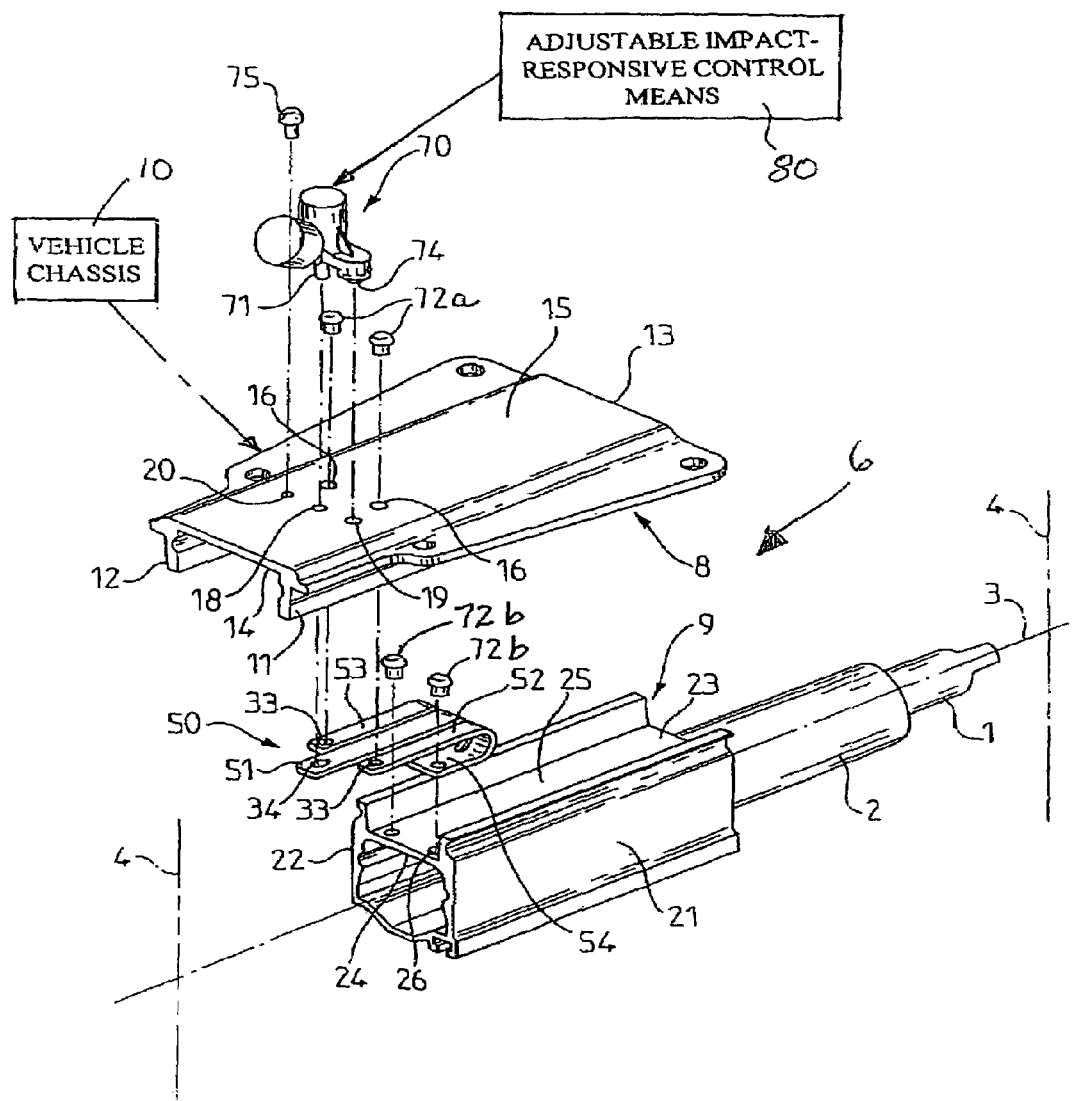
FIG. 1 is an exploded front perspective view of the impact energy absorbing many of the present invention.
Figure 3:
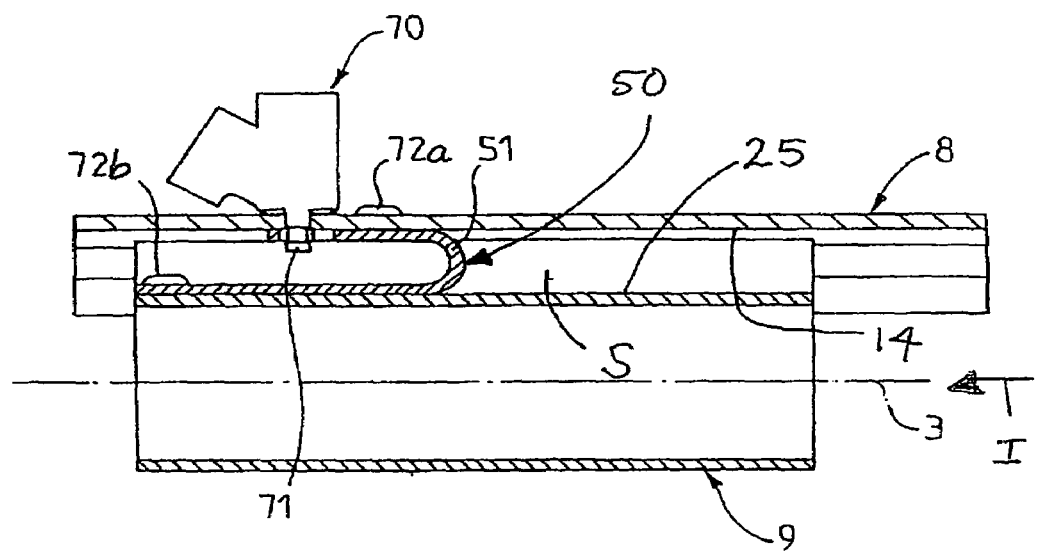
FIG. 3 is a corresponding sectional view illustrating the movable support member in its second position, and with the pyrotechnic device in its connected condition.

Referring first more particularly to FIG. 1, the energy absorbing means 50 of the present invention is used in connection with the steering mechanism of an automotive vehicle including the steering shaft 1 which is rotatably supported within the mounting tube 2 for rotation about the steering shaft axis 3 which is contained in the vertical plane 4—4. The steering mechanism is supported by support means 6 including a fixed support member 8 that is bolted to the vehicle chassis 10, and a movable member 9 that is slidably connected with the fixed support member 8. The movable support member includes slide rails or guides 21 and 22 that slidably extend within corresponding slide rails or guides 11 and 12 provided on the fixed support member 8, which comprises a plate 13. The movable support member 9 is hollow and contains a central bore for receiving the steering tube 2, and includes a top wall 23 that connects the slide rails 21 and 22. A chamber S is defined between the upper surface 25 of the top wall 23 and the lower surface 14 of the support member 8, as best shown in FIG. 3. The energy absorbing means 50 of the present invention is installed in this chamber.

The energy absorbing means 50 includes a plurality of energy absorbing elements 51, 52, and 53 of generally U-shaped configuration, including a common base portion 54. The base portion 54 is fastened to the top wall 23 of the movable support member 9 by lower fastening pins 72b that extend within apertures 26 contained in the movable member top wall 23. The outer pair of the energy absorbing members 52 and 53 are connected to the stationery fixed support 8 by the upper fastening pins 72a. As will be described in greater detail below, the center energy absorbing element 51 is connected with the fixed support member 8 by an axially displaceable pin 71 that extends downwardly from the pyrotechnic device 70, as will be described greater detail below. The upper pins 72a extend into circular apertures 33 contained in the upper legs of the energy absorbing elements, and the pin 71 from the pyrotechnic device extends within an elongated aperture 34 contained in the upper leg of the center energy absorbing element 51.

The tube body 2 is connected to the support means 6 by a position adjustment system in terms of depth or inclination, or by a depth and inclination adjustment system. The invention can also apply to a non-adjustable steering column, and in that case, the tube body 2 is connected directly to the support means 6. The movable support member 9 is normally restrained against movement relative to the fixed support member 8 at a certain resistance value. In the event of an impact to the vehicle that produces an impact force that exceeds this resistance restraining value, the energy absorbing system (50) of the present invention is activated.

Figure 5:
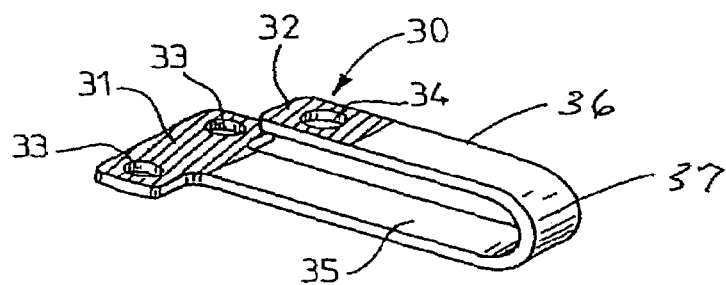
FIG. 5 is a perspective view of one of the energy absorbing elements.
Figure 9:
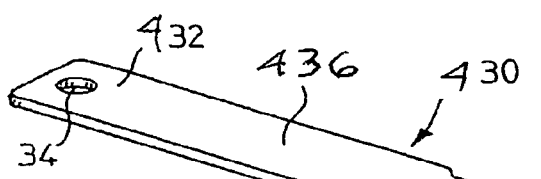
FIG. 9 illustrates another modification of the element of FIG. 5 when in the deformed condition.
Figure 9B:
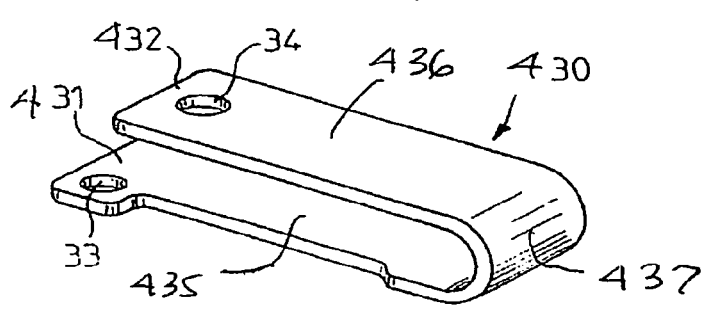
FIG. 9B illustrates the element when in its initial non-deformed condition.
Figure 9A:
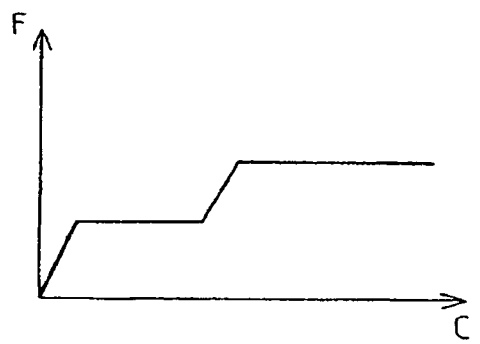
FIG. 9A illustrates the operation of this embodiment.
Figure 10:
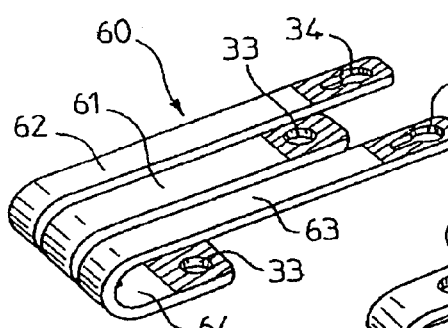
FIGS. 10–14 are perspective view of a three element embodiment of the energy absorbing assembly with the elements thereof in different states of deformation.
Figure 11:
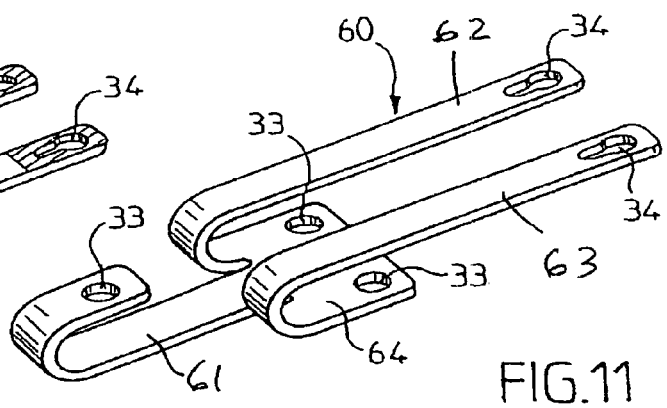
Figure 12:
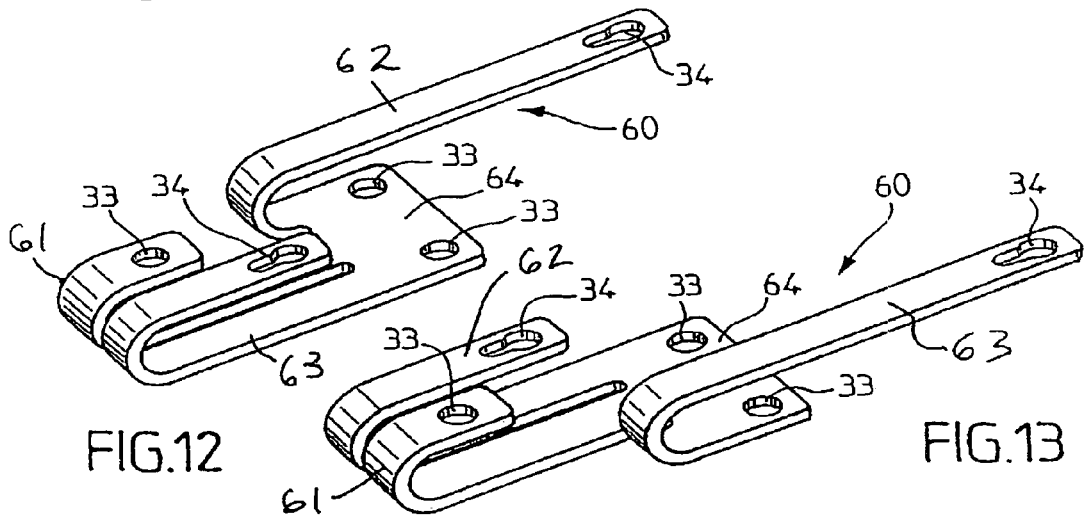
Figure 13:
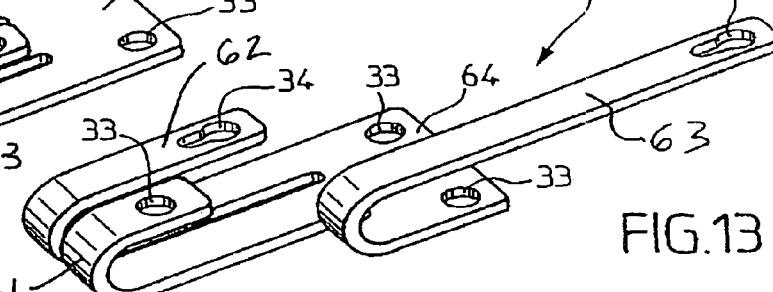
Figure 14:
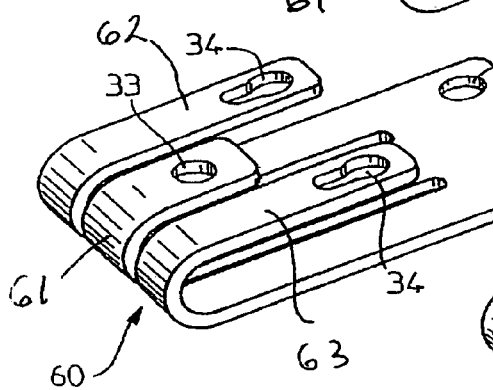

As shown in FIGS. 5 and 9B, the energy absorbing elements 30 are generally U-shaped and include terminal portions 31 and 32 arranged at the ends of leg portions 35 and 36 formed by the curved connecting portion 37.

The first terminal portion 31 of U-shaped element 30 is coupled to movable support member 9 by a retaining pin 72b.

Figure 2:
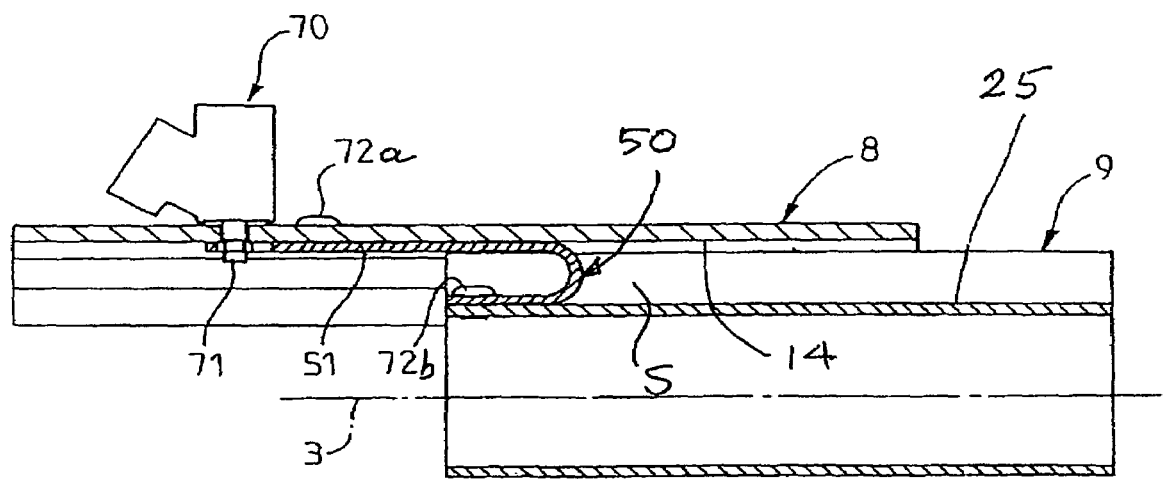
FIG. 2 is a longitudinal sectional view illustrating the movable support member in its initial position relative to the fixed support member.
Figure 4:
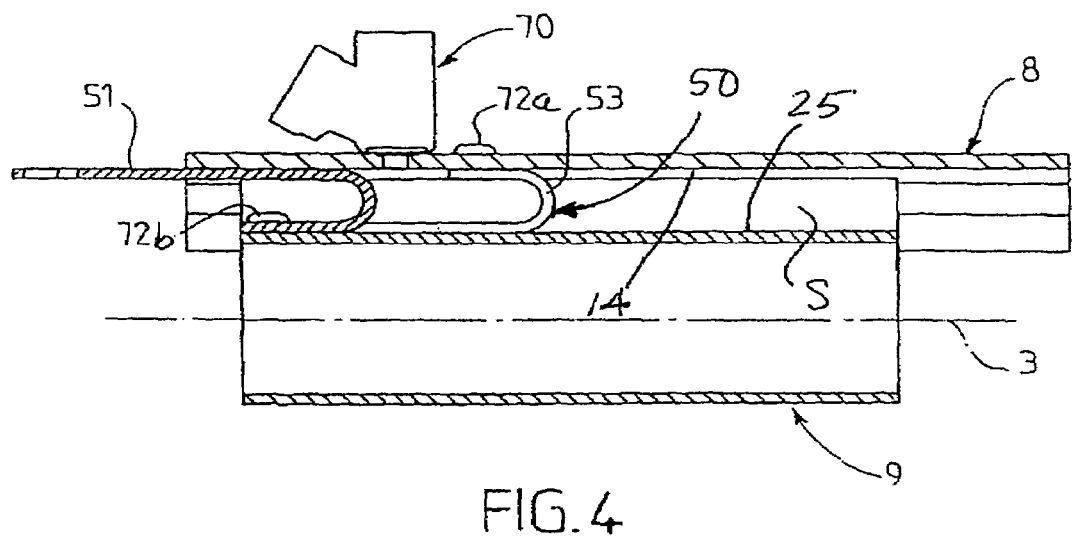
FIG. 4 is a corresponding sectional view illustrating the movable support member in its second position and with the pyrotechnic device in the disengaged condition.

The second terminal portion 32 of U-shaped element 30 is coupled to fixed support member 8 by a retaining pin 71. These two types of coupling with absorption element 51 are shown in FIGS. 2, 3 and 4.

Absorption element 30 is deformable and is folded back upon itself around an axis that is essentially normal to the direction of the effort to be absorbed with a determined curvature radius at the of the fold.

Energy absorbing element 30 is arranged between support face 14 of fixed support member 8 and support face 25 of movable support member 9 so that there will be no relative friction during the impact. There is thus no friction between member element 30 and support face 14 of fixed support member 8 and between element 30 and support face 25 of movable support element 9. Absorption element 30 always remains coupled to fixed support member 8 and to mobile support element 9 during the impact.

Retaining pin 71 is either explosively severed or axially displaceable by the pyrotechnical displacement means 70 that are activated by adjustable control means 80. Thus, in case of an impact and depending upon the value of the chosen parameters, support member 9 is coupled to fixed support member 8 by a desired number of absorption elements 30 so that movable support member 9, coupled to tube body 2 and thus to the steering wheel, will be displaced with respect to fixed support member 8, thus absorbing all or a portion of the required energy to be dissipated.

Referring now to FIG. 2, the movable support element 9 is normally in the illustrated first position spaced from the left hand end of the fixed support member. Consequently, the energy absorbing means 50 is in its initial non-deformed condition.

Upon the application of impact to the movable support member 9 as shown by the arrow I in FIG. 3, the movable support member 9 is displaced to the left toward the left hand end of the fixed support member 8 with all three energy absorbing members being deformed to produce the maximum force resisting movement of the movable member 3. Thus, the maximum resistance force is produced as a result of the input parameters supplied to the non-firing pyrotechnic device from the adjustable control means 80.

In the situation illustrated in FIG. 4, the parameters supplied to the pyrotechnic device 70 via the adjustable impact-responsive control means is such that the pyrotechnic device fires to explosively separate the retaining pin 71 from the pyrotechnic device 70, whereupon the center element 51 is released, and only the side elements 52 and 53 are deformed during the displacement of the movable member to its second position relative to the fixed member. In this case, a reduced resistive force is produced by the energy absorbing means 50.

The central portion of the energy absorbing element or of each energy absorbing element is a strip with a rectangular or square cross-section. The strip is arranged between support face 14 of fixed support member 8 and support face 25 of movable support member 9. Thus, there is no relative friction between the external face with respect to the fold of said strip and each of said support faces 14 and 15 during the impact. The length and cross-section of the central portion or strip have values that are determined by the quantity of energy to be absorbed.

In the case of an energy absorption assembly with several absorption elements, certain absorption elements could have a second terminal portion 32 with a fixed retaining pin and passage hole 34.

Figure 5A:
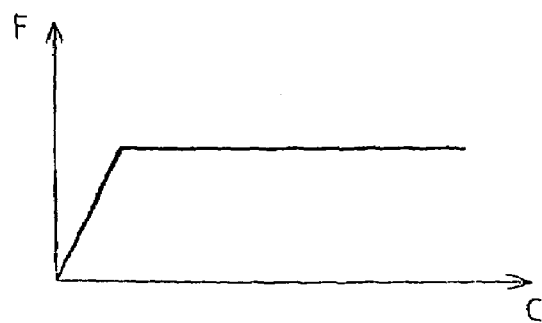
FIG. 5A is a resistance versus distance curve illustrating the operation of the element of FIG. 5.

In the case of the impact absorbing element 30 of FIG. 5, the leg and connecting portions 35, 36, and 37 have a constant cross-section from the first terminal portion 31 onward. The variation in resistance effort F as a function of course or distance C is illustrated in FIG. 5A, which is stabilized after an initial rise.

Figure 6:
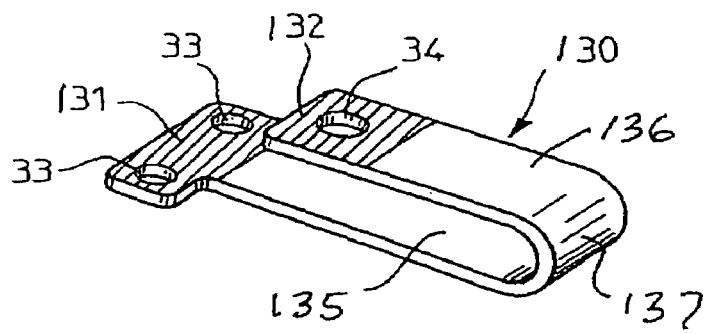
FIG. 6 is a perspective view of a modification of the energy absorbing element of FIG. 5.
Figure 6A:
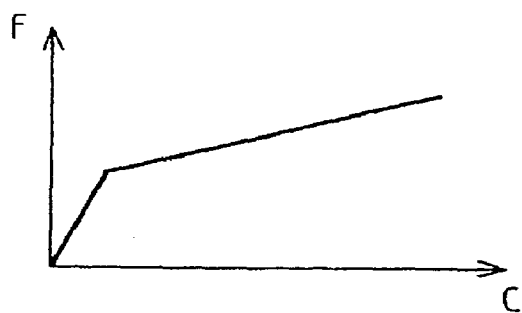
FIG. 6A is a curve illustrating the resistance versus distance curve of the element of FIG. 6.

In the modification shown in FIG. 6, U-shaped element 130 has a cross-section that varies uniformly, progressively increasing from the first terminal portion 131. The variation in the resistance effort F as a function of distance C is shown in FIG. 6A, which initially increases after a rise.

Figure 7:
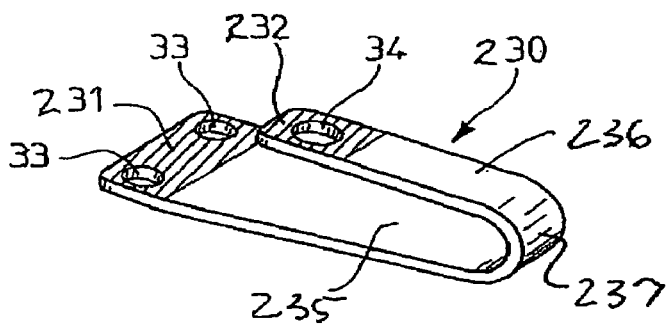
FIG. 7 is a perspective view of another modification of the energy absorbing element of FIG. 5.
Figure 7A:
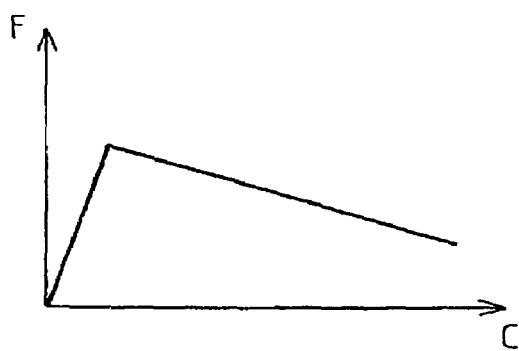
FIG. 7A is an operational curve of the embodiment of FIG. 7.

In the modification of FIG. 7, U-shaped element 230 has a cross-section that varies uniformly, progressively decreasing after the first terminal portion 31. The variation in the resistance effort F as a function of distance C is shown in FIG. 7A, which initially diminishes after a rise.

Figure 8:
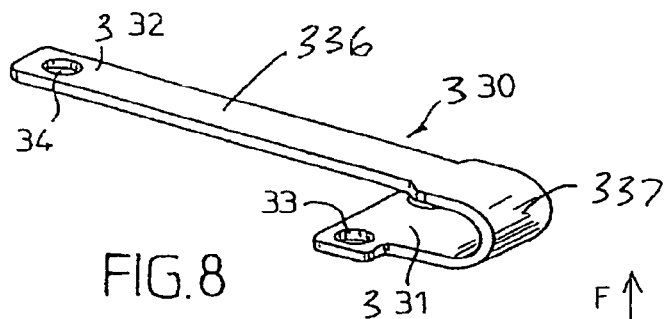
FIG. 8 is a perspective view of another element embodiment when in the deformed condition.
Figure 8B:
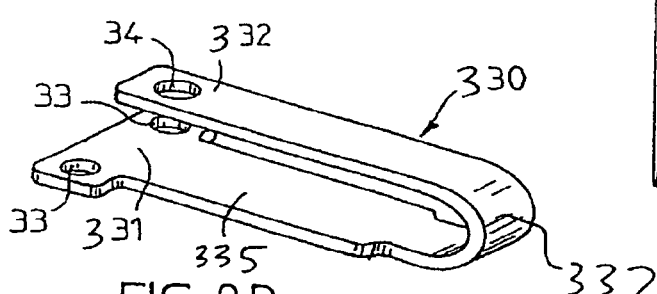
FIG. 8B illustrates the element in its normal non-deformed condition.
Figure 8A:
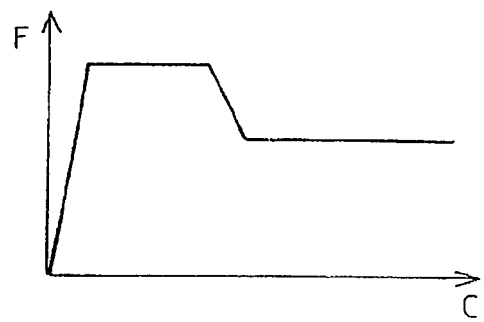
FIG. 8A illustrates the operation of the element of FIG. 8.

In FIGS. 8 and 8B, the U-shaped element 330 has a cross-section that varies by steps with a first cross-section step that is thicker from the first terminal portion 31 onward. The variation in resistance effort F as a function of course C is shown in FIG. 8A, which, after an initial rise, is stabilized at a first step, then at a thinner second step.

In the modification in FIGS. 9 and 9B, U-shaped element 430 has a cross-section that varies by steps with a first cross-section step that is thinner from the first terminal portion 31 onward. The variation in resistance effort F as a function of distance C is shown in FIG. 8A, which, after an initial rise, is stabilized at a first step, then at a thicker second step.

Figure 15:
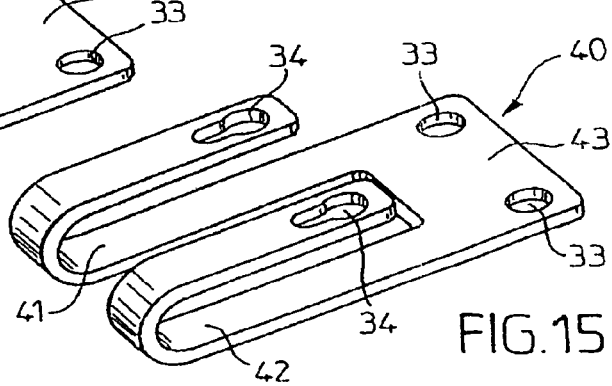
FIG. 15 is a perspective view of a two-element embodiment of the invention.

Referring now to the embodiment illustrated in FIG. 15, the energy absorbing means 40 includes two energy absorbing elements 41 and 42 having a common base portion 43. In this embodiment, both of the elements contain elongated apertures 34 for receiving the axially displaceable retaining pins 71 of pyrotechnic devices mounted on the fixed support member, and two apertures 33 for receiving the lower fastening pins 72b for connection with the movable support member.

Referring now to the embodiment of FIGS. 10–14, the energy absorbing means 60 includes three U-shaped elements 61, 62, and 63, the outer elements 62 and 63 having upper legs that contain elongated openings 34 for receiving the axially displaceable retaining pins 71, and the upper leg of the center element 61 containing a circular opening 33 for receiving an upper retaining pin 72a. The common base portion 64 of the energy absorbing means contains a pair of circular openings 33 that receive the lower connecting pins 72b, thereby to convert the device between the movable and stationary support members (not shown).

Figure 16:
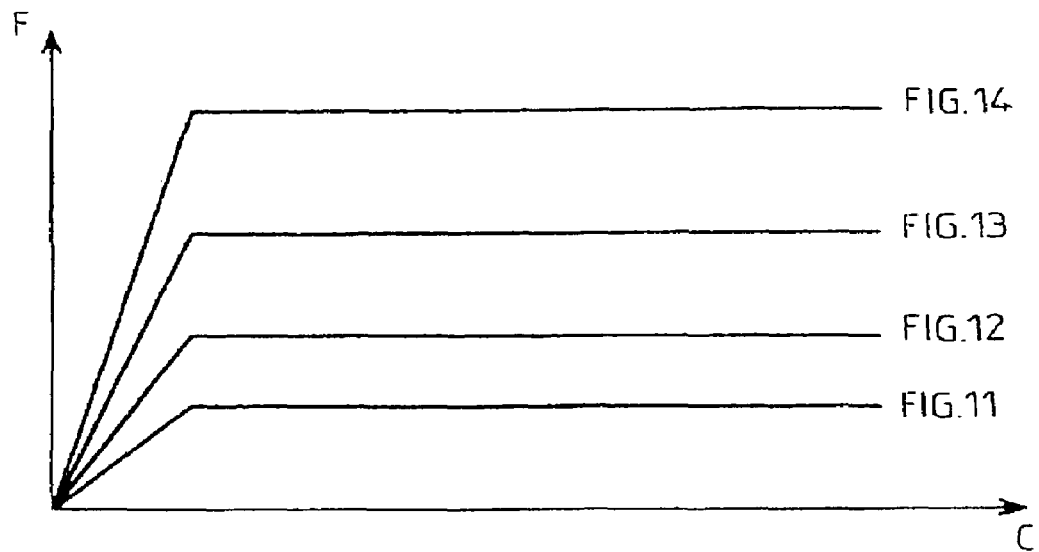
FIG. 16 illustrates the operation of the embodiments of FIGS. 11–14.

FIG. 16 shows the curves for the variation of resistance effort F for a U-shaped element of with a constant cross-section and for the different configurations shown in FIGS. 11 to 14.

Figure 17:
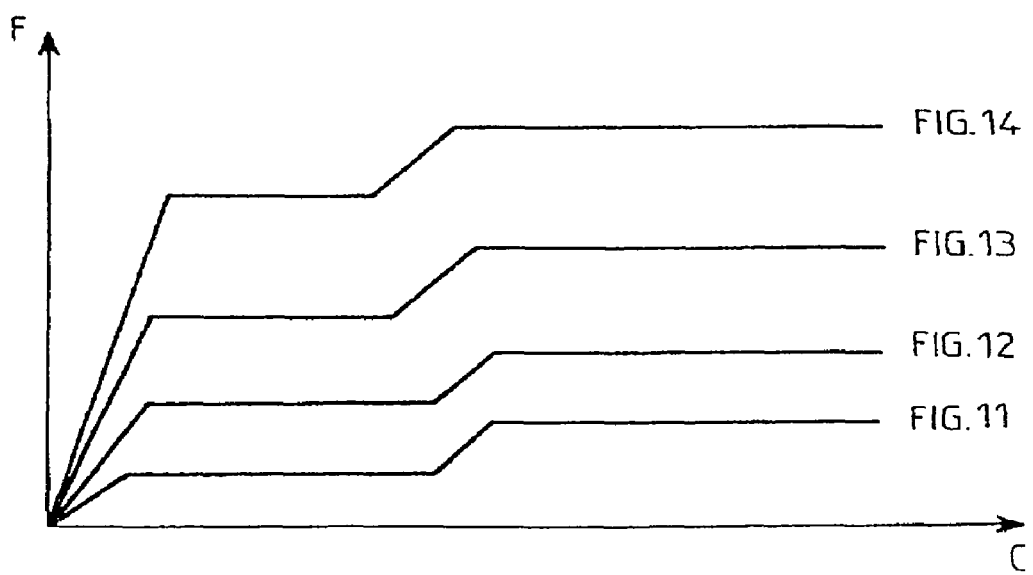
FIG. 17 illustrates these embodiments having cross-sections that vary in steps.
Figure 18:
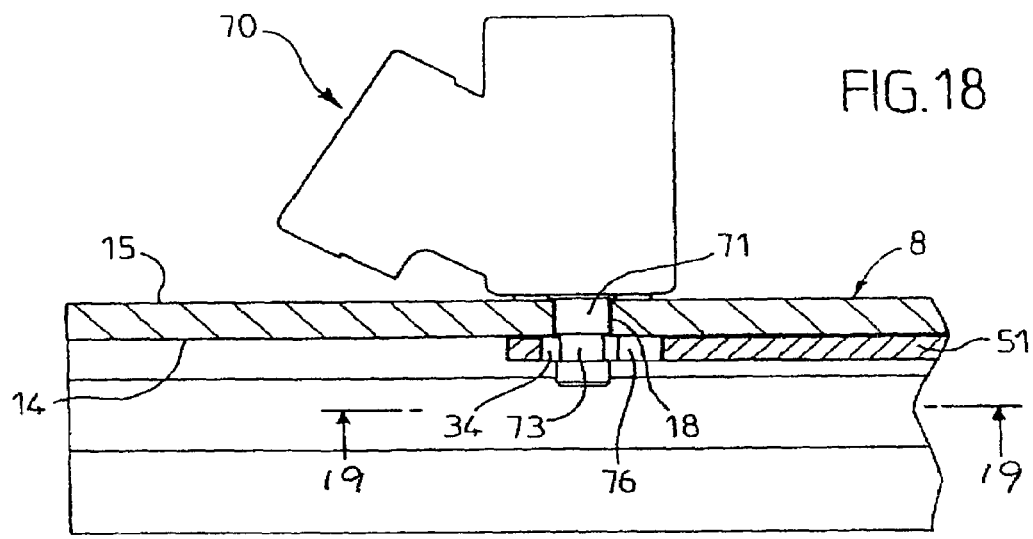
FIG. 18 is a longitudinal sectional view of a pyrotechnic device having a connecting pin having an intermediate portion of reduced diameter.
Figure 19:
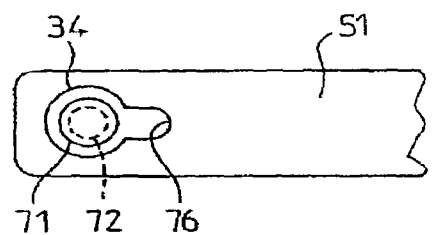
FIG. 19 is a sectional view taken along line 19—19 of FIG. 18.

FIG. 17 shows the variation curves in resistance effort F for an element 430 with a cross-section that varies by steps and that increases.

Figure 20:
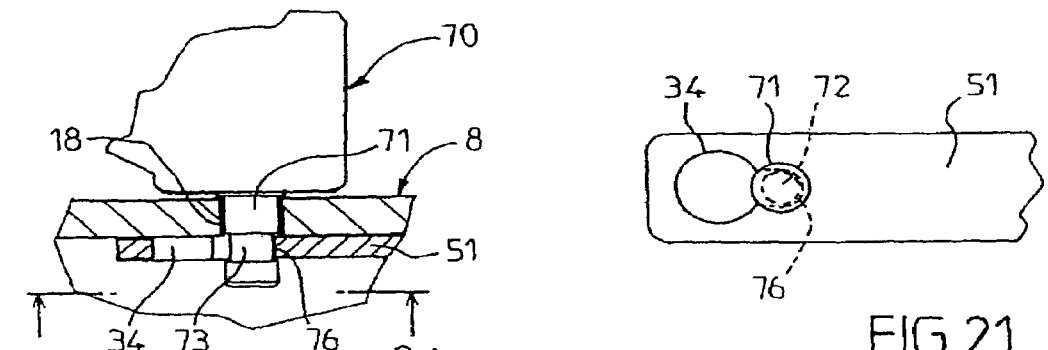
FIG. 20 is a detailed view of the operation of the pyrotechnic device of FIG. 18.
Figure 21:
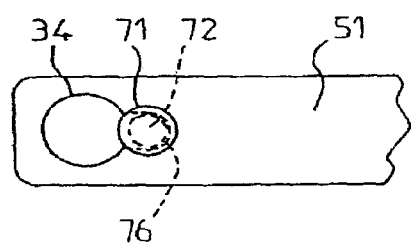
FIG. 21 is a sectional view taken along line 21—21 of FIG. 20.

Referring now to the alternate embodiment of pyrotechnic device illustrated in FIGS. 18–21, the retaining pin 71 associated with the pyrotechnic device 70 is axially displaceable and contains a intermediate portion 73 of reduced diameter. Furthermore, the aperture 34 is provided with an elongated portion 76 that is adapted to receive the reduced portion as shown in FIGS. 20 and 21, thereby varying the effective length and the resulting resistance effect afforded by the energy absorbing element 51.

Thus, according to the present invention, the pyrotechnic displacement control means is so arranged that in case of an impact, movable support member 9 would be coupled to fixed support element 8 by any absorption element or by the absorption element 3, so that movable support member 9, linked to tube body 2 and thus to the steering wheel, will be displaced with respect to fixed support member 8, absorbing all or a portion of the required energy to be dissipated.

In the two-element embodiment 40 of FIG. 15, the upper legs of both elements 41 and 42 contain elongated apertures 34 for receiving the axially-displaceable retaining pins 71 of the pyrotechnic devices 70. In this case, the effective length of, and the resistive force developed by each leg, can be controlled by means of the axial position of the pin 71.

In the energy absorbing means 60 of FIGS. 10–14, at least one of the legs of the energy absorbing elements is provided with an elongated aperture 43 for cooperation with an axially displaceable retaining pin 71.

Each of the energy absorption assembly 50, 60 comprises three absorption elements 51, 52 and 53–61, 62 and 63, each having a certain cross-section which is specific to it alone so as to absorb a particular quantity of energy, there is at least one absorption element 51, 52, 53–61, 62, 63 which has a mobile retaining rod 71.

The pyrotechnical displacement control means are so arranged that in case of an impact, movable support member 9 would be linked to fixed support member 8 by any absorption element; or by the first absorption element 51, 61; by the second absorption element 52, 62; by the third absorption element 53, 63; by the first absorption element 51, 61 with the second absorption element 52, 62; by the first absorption element 51, 61 with the third absorption element 53, 63; by the second absorption element 52, 62 with the third absorption element 53, 63; or by the three absorption elements 51, 52 and 53–61, 62 and 63, whereby movable support means 9 coupled to tube body 2 and thus to the steering wheel, will be displaced with respect to fixed support member 8 by absorbing all or a portion of the energy that is to be dissipated.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. Energy absorbing means for absorbing the impact energy developed in the steering mechanism of an automotive vehicle having a chassis (10), said steering mechanism including a steering shaft (1) having a steering axis (3), and a steering tube (2) arranged concentrically about the steering shaft, said energy storing apparatus including:
    (a) first (8) and second (9) support members connected for sliding displacement in a direction parallel with said steering shaft axis, said first and second support members including a pair of adjacent parallel spaced surfaces (14, 25) parallel with said steering axis, said first and second support members being adapted for connection with said vehicle chassis and said steering tube, respectively, said second support member being displaceable upon vehicle impact from a first position spaced from one end of said first support member toward a second position adjacent said first support member one end;

(b) energy absorbing means (40; 50; 60) including a plurality of deformable energy absorbing elements normally connected between said first and second support members for resisting movement of said second support member from said first position toward said second positions, said energy absorbing elements being arranged between said pair of parallel spaced surfaces, each of said energy absorbing elements being generally U-shaped and including:

(1) a pair of parallel spaced leg portions extending parallel with said steering shaft axis adjacent said parallel surfaces of said first and second support surfaces, respectively; and (2) a curved connections portion connecting the ends of said leg portions remote from said first support member one end; and (3) a plurality of connecting means normally connecting the free ends of said leg portions of said enemy absorbing elements with said first and second support members, respectively, said connecting means including (a) first pins (72*b*) for connecting one leg of each of the impact absorbing elements with corresponding apertures (26) contained in the movable support member;

(b) at least one second pin (71) extending from said pyrotechnic means into an aperture (34) contained in the other leg of at one of said enemy absorbing elements; and (c) third pins (72*a*) for connecting said first support member with corresponding apertures (33) contained in the other legs of the remaining enemy absorbing elements; and (c) controllable pyrotechnic means (70) operable upon impact to vary the amount of resistive force provided by said energy absorbing means.

2. Energy absorbing means as defined in claim 1, wherein said second pin is operable to a severed condition by said pyrotechnic means.

3. Energy absorbing means as defined in claim 1, wherein said second pin is axially displaceable by said pyrotechnic means relative to said energy absorbing element from first position to a second position, thereby to vary the resistive force developed by the associated energy absorbing member.

4. Energy absorbing means as defined in claim 1, wherein said second pin contains an intermediate portion of reduced diameter (73); and further wherein the aperture (34) associated with said one connecting pin is elongated includes an extension portion (76) that extends in the direction away from said first support member one end, said elongated aperture being dimensioned to receive said one connecting pin reduced diameter portion when said one connecting pin is in said disconnect position, thereby to vary the resisting impact force afforded by the associated energy absorbing element.

5. Energy absorbing means as defined in claim 1, wherein the leg portions of said U-shaped energy absorbing elements adjacent said second support member are joined by a common connecting base portion (43; 54; 64).

6. Energy absorbing means as defined in claim 1, wherein said energy absorbing means (40) includes two energy absorbing elements (41, 42).

7. Energy absorbing means as defined in claim 1, wherein said energy absorbing means (50; 60) includes a least three energy absorbing elements (51, 52, 53; 61, 62, 63).

8. Energy absorbing means as defined in claim 1, wherein the leg portions of said U-shaped elements have the same width throughout their length.

9. Energy absorbing means as defined in claim 1, wherein the leg portions of at least one of said energy absorbing elements have different widths.

10. Energy absorbing means as defined in claim 1, wherein one leg portion of at least one of said U-shaped energy absorbing elements has a tapered width that decreases in the direction of said leg connecting portion.

11. Energy absorbing means as defined in claim 1, wherein the width of one leg portion of at least one of said U-shaped energy absorbing elements is greater than that of the associated other leg portion.

12. Energy absorbing means as defined in claim 1, wherein the width of at least one leg portion of at least one of said U-shaped energy absorbing elements is stepped.

13. Energy absorbing means as defined in claim 1, wherein said leg portions of said U-shaped energy absorbing elements have a rectangular cross-sectional configuration.

* * * * *